(12) United States Patent
Du et al.

(10) Patent No.: US 11,320,055 B2
(45) Date of Patent: May 3, 2022

(54) GAS FLOW REGULATING DEVICE AND MASS FLOW CONTROLLER

(71) Applicant: BEIJING SEVENSTAR FLOW CO., LTD., Beijing (CN)

(72) Inventors: Jingqing Du, Beijing (CN); Manli He, Beijing (CN); Qianyi Su, Beijing (CN)

(73) Assignee: BEIJING SEVENSTAR FLOW CO., LTD., Beijing (CN)

( * ) Notice: Subject to any disclaimer, the term of this patent is extended or adjusted under 35 U.S.C. 154(b) by 0 days.

(21) Appl. No.: 16/626,771

(22) PCT Filed: Jul. 24, 2018

(86) PCT No.: PCT/CN2018/096837
§ 371 (c)(1),
(2) Date: Dec. 26, 2019

(87) PCT Pub. No.: WO2020/014995
PCT Pub. Date: Jan. 23, 2020

(65) Prior Publication Data
US 2021/0332895 A1     Oct. 28, 2021

(30) Foreign Application Priority Data
Jul. 18, 2018   (CN) .......................... 201810792867.3

(51) Int. Cl.
*F16K 7/16*     (2006.01)
*F16K 27/02*    (2006.01)
(Continued)

(52) U.S. Cl.
CPC .............. *F16K 7/16* (2013.01); *F16K 27/029* (2013.01); *F16K 27/0236* (2013.01);
(Continued)

(58) Field of Classification Search
CPC .......... F16K 7/14; F16K 7/16; F16K 27/0236; F16K 27/029; F16K 31/007; F16K 1/42; G05D 7/0635
(Continued)

(56) References Cited

U.S. PATENT DOCUMENTS 4,359,204 A * 11/1982 Williams ........... B60H 1/00485
137/197
4,660,748 A *  4/1987 Hagan .................. B67D 1/0456
141/15
(Continued)

FOREIGN PATENT DOCUMENTS

CN    101725739    6/2010
CN    101749475    6/2010
(Continued)

OTHER PUBLICATIONS

Chinese Search Report dated Nov. 20, 2018.

*Primary Examiner* — William M McCalister
(74) *Attorney, Agent, or Firm* — Ipsilon USA, LLP (57) ABSTRACT

The present disclosure provides a gas flow regulating device and a mass flow controller. The gas flow regulating device includes: a valve port component, in which a first inlet channel is provided; a push rod component, in which a first through hole is provided, a push rod being provided in the first through hole, a first end surface of the push rod facing a gas outlet end of the first inlet channel, and the push rod being elastically connected with the push rod component through an elastic diaphragm; and a driving assembly configured to drive the push rod to move along a direction of approaching or leaving the first inlet channel to cause the first end surface of the push rod to be in contact with and seal or separate from the gas outlet end of the first inlet channel. In the gas flow regulating device, the structure can be
(Continued)

simplified, the number of parts in contact with gas can be reduced, and the fault caused by the failure of a spring piece can be avoided.

12 Claims, 5 Drawing Sheets (51) Int. Cl.
  *F16K 31/00* (2006.01)
  *G05D 7/06* (2006.01)
  *F16K 1/42* (2006.01)
(52) U.S. Cl.
  CPC .............. *F16K 31/007* (2013.01); *F16K 1/42* (2013.01); *G05D 7/0635* (2013.01)
(58) Field of Classification Search
  USPC .................................................. 251/331, 361
  See application file for complete search history.

(56) References Cited

U.S. PATENT DOCUMENTS

| | | | | |
|---|---|---|---|---|
| 5,002,086 A * | 3/1991 | Linder | ................ | F16K 17/0453 137/312 |
| 5,027,857 A * | 7/1991 | Champseix | ............ | F16K 31/563 137/625.44 |
| 5,758,864 A * | 6/1998 | Asai | .......................... | F16K 7/14 251/129.17 |
| 5,988,215 A * | 11/1999 | Martin | .................... | F24C 3/128 137/613 |
| 6,321,776 B1 * | 11/2001 | Pratt | ......................... | F16K 7/14 137/312 |
| 6,585,226 B2 * | 7/2003 | Fukano | ................ | F16K 31/1225 251/28 |
| 6,672,561 B2 * | 1/2004 | Kerg | ...................... | F16K 41/103 251/331 |
| 7,108,241 B2 * | 9/2006 | Yoshino | ............. | G05D 16/0652 251/61.5 |
| 7,650,903 B2 * | 1/2010 | Yamamoto | ............ | F16K 31/126 137/487.5 |
| 7,878,479 B2 * | 2/2011 | Yamamoto | ................ | F16K 1/44 251/61.4 |
| 9,829,112 B2 * | 11/2017 | Smith | ........................ | F16K 1/36 |
| 2001/0019116 A1 * | 9/2001 | Fukano | ................ | F16K 31/1221 251/63.6 |
| 2004/0099311 A1 * | 5/2004 | Fukano | ..................... | F16K 7/16 137/312 |
| 2004/0218020 A1 * | 11/2004 | Shibata | ................ | B41J 2/17596 347/85 |
| 2005/0145278 A1 * | 7/2005 | Igawa | ................. | F16K 31/1268 137/486 |
| 2007/0075284 A1 * | 4/2007 | Masamura | ................ | F16K 7/17 251/63.5 |
| 2014/0319403 A1 * | 10/2014 | Kitano | ..................... | F16K 7/16 251/331 |
| 2015/0115191 A1 * | 4/2015 | Akamoto | ............. | F16K 31/122 251/331 |

FOREIGN PATENT DOCUMENTS

| | | |
|---|---|---|
| CN | 103728991 | 4/2014 |
| CN | 206889710 | 1/2018 |

* cited by examiner

GAS FLOW REGULATING DEVICE AND MASS FLOW CONTROLLER

RELATED APPLICATION:

This application is a National Phase of PCT/CN2018/096837 filed on Jul. 24, 2018, which claims the benefit of priority from Chinese Patent Application No. 2018-10792867.3 filed on Jul. 18, 2018, the entirety of which are incorporated by reference.

TECHNICAL FIELD

The present disclosure relates to the field of flow control, in particular to a gas flow regulating device and a mass flow controller.

BACKGROUND

A gas mass flow controller (MFC) is used to precisely measure and control the mass flow of gases. Gas mass flow controllers have important applications in scientific research and production in fields of semiconductor and integrated circuit processes, special material science, chemical industry, petroleum industry, medicine, environmental protection, vacuum, and the like.

A gas mass flow controller is generally composed of a flow divider, a flow measuring device, a flow regulating device, and a control circuit board. The flow divider is used to divide the gas into the flow measuring device and an internal channel of the flow divider according to a predetermined flow ratio. The flow regulating device is arranged in a gas channel and is used to regulate a gas flow in the gas channel. The control circuit board is used to receive a flow detection signal sent from the flow measuring device, perform calculation according to the flow detection signal, and control the flow regulating device to regulate the gas flow passing through the gas channel according to the calculation result until the gas flow is equal to a set flow value.

The valve core and valve port of an existing flow regulating device have complex structures, high difficulty in manufacturing and processing, and high rejection rate, and a large number of parts that come into contact with the gas. Due to special requirements on material and surface treatment of the parts in contact with the gas, the parts have high processing difficulty and high manufacturing cost. In addition, the existing flow regulating device achieves contact seal or separation between the valve core and the valve port by means of elastic action of two spring pieces. However, the spring pieces are frequently compressed, returned and deformed when opening and closing the valve and regulating the flow, so that the spring pieces are likely to become fatigue and fail, resulting in that the failure rate of the valve is high, and the normal use of the device is influenced.

SUMMARY

The present disclosure aims to solve at least one of the technical problems in the prior art, and provides a gas flow regulating device and a mass flow controller, which can simplify the structure, reduce the number of parts in contact with gas and avoid the breakdown caused by the failure of a spring piece.

To achieve the object of the present disclosure, there is provided a gas flow regulating device including:

a valve port component, in which a first inlet channel is provided;

a push rod component, wherein a first through hole is provided in the push rod component, a push rod is provided in the first through hole, a first end surface of the push rod faces a gas outlet end of the first inlet channel, and the push rod is elastically connected with the push rod component through an elastic diaphragm; and a driving assembly configured to drive the push rod to move along a direction of approaching or leaving the first inlet channel to cause the first end surface of the push rod to be in contact with and seal the gas outlet end of the first inlet channel or to be separated from the gas outlet end of the first inlet channel.

Optionally, an annular opening adjusting pad is disposed between the valve port component and the push rod component, and is configured to adjust deformation of the elastic diaphragm when the first end surface of the push rod is brought into contact with and seals the gas outlet end of the first inlet channel.

Optionally, the driving assembly includes:

a fixing piece disposed on a side of the push rod component distal to the first end surface of the push rod;

a compression spring set between the fixing piece and the push rod; and a connection cavity disposed on a side of the fixing piece distal to the compression spring, wherein an end of the connection cavity penetrates through the fixing piece and is connected to an end of the compression spring proximal to the push rod; the connection cavity and the fixing piece form a closed space, and a piezoelectric material is provided in the closed space; and elongation of the piezoelectric material is adjustable by adjusting a voltage applied to the piezoelectric material, so as to adjust a displacement amount of the connection cavity along a direction of leaving the push rod along with the elongation of the piezoelectric material.

Optionally, the compression spring is in a compressed state such that the first end surface of the push rod is brought into contact with and seals the gas outlet end of the first inlet channel under the elastic action of the compression spring when the piezoelectric material is not powered on.

Optionally, a first outlet channel is further provided in the valve port component, and a gas inlet end of the first gas outlet channel connects with the gas outlet end of the first inlet channel when the first end surface of the push rod is separated from the gas outlet end of the first inlet channel;

the gas flow regulating device further includes a channel component disposed on a side of the valve port component distal to the push rod component, and the channel component overlaps with the valve port component, a second inlet channel and a second outlet channel being provided in the channel component, wherein a gas outlet end of the second inlet channel is connected to the gas inlet end of the first inlet channel; and a gas inlet end of the second outlet channel is connected to the gas outlet end of the first outlet channel.

Optionally, a surface of the channel component facing the valve port component serves as a channel sealing surface, and a groove is provided on the channel sealing surface, and the valve port component is disposed in the groove;

the push rod component includes a body, the first through hole is provided in the body, and the body and the valve port component overlap with each other; a boss is circularly provided on a peripheral wall of the body, the boss is stacked on the channel sealing surface, and a first seal member is provided between the boss and the channel sealing surface.

Optionally, a first annular groove is provided on a surface of the valve port component facing the push rod component; a plurality of second through holes spaced apart from each other are provided along a circumferential direction of the first annular groove on a bottom surface of the first annular groove, and one of the plurality of second through holes serves as the first outlet channel.

Optionally, a second annular groove is further provided on a surface of the valve port component facing the channel component, and the second annular groove connects with each of the plurality of second through holes.

Optionally, a second seal member is provided between the valve port component and the channel component and around an inner circumferential wall of the first inlet channel.

Optionally, the driving assembly includes a linear drive source.

According to another aspect, the present disclosure further provides a mass flow controller, including the gas flow regulating device provided by the present disclosure.

Optionally, the mass flow controller further includes:
an inflow port;
a gas channel, wherein a gas inlet end of the gas channel is connected with the inflow port; the gas flow regulating device is disposed on the gas channel and configured to regulate gas flow in the gas channel; and
an outflow port connected with a gas outlet end of the gas channel.

Optionally, the mass flow controller further includes:
a control circuit board configured to receive a flow detection signal sent from a flow measuring device, calculate a difference between the flow detection signal and a set flow value, and control the gas flow regulating device to regulate the gas flow passing through the gas channel according to the calculated difference until the gas flow is equal to the set flow value.

The present disclosure has the beneficial effects as follows.

In the gas flow regulating device provided by the present disclosure, a first through hole is provided in a push rod component, a push rod is provided in the first through hole, and a first end surface of the push rod faces a gas outlet end of a first inlet channel; and the push rod is elastically connected with the push rod component through an elastic diaphragm. By utilizing a driving assembly to drive the push rod to move along a direction of approaching or leaving the first inlet channel, the first end surface of push rod is brought into contact with and seals the gas outlet end of the first inlet channel or separates from the gas outlet end of the first inlet channel, so as to close or open a gas channel. In addition, by adjusting a displacement amount of the push rod, regulation of gas flow can be achieved. The push rod component can function as both a valve core and a push rod by means of the push rod and the elastic diaphragm, thus the structure can be simplified, and the number of parts that come into contact with the gas can be reduced, which in turn can reduce the processing and product costs. Meanwhile, by replacing the spring piece with the elastic diaphragm, the fault caused by the failure of the spring piece can be avoided, and thus the reliability of the device can be improved.

In the mass flow controller provided by the present disclosure, by adopting the gas flow regulating device provided by the present disclosure, the structure can be simplified, and the number of parts in contact with the gas can be reduced, so as to reduce the processing and product costs; in addition, the fault caused by the failure of the spring piece can be avoided, thereby improving the reliability of the device.

DETAILED DESCRIPTION

In order to enable those skilled in the art to better understand the technical solutions of the present disclosure, the gas flow regulating device and the mass flow controller provided by the present disclosure are described in detail below with reference to the accompanying drawings.

Figure 1:
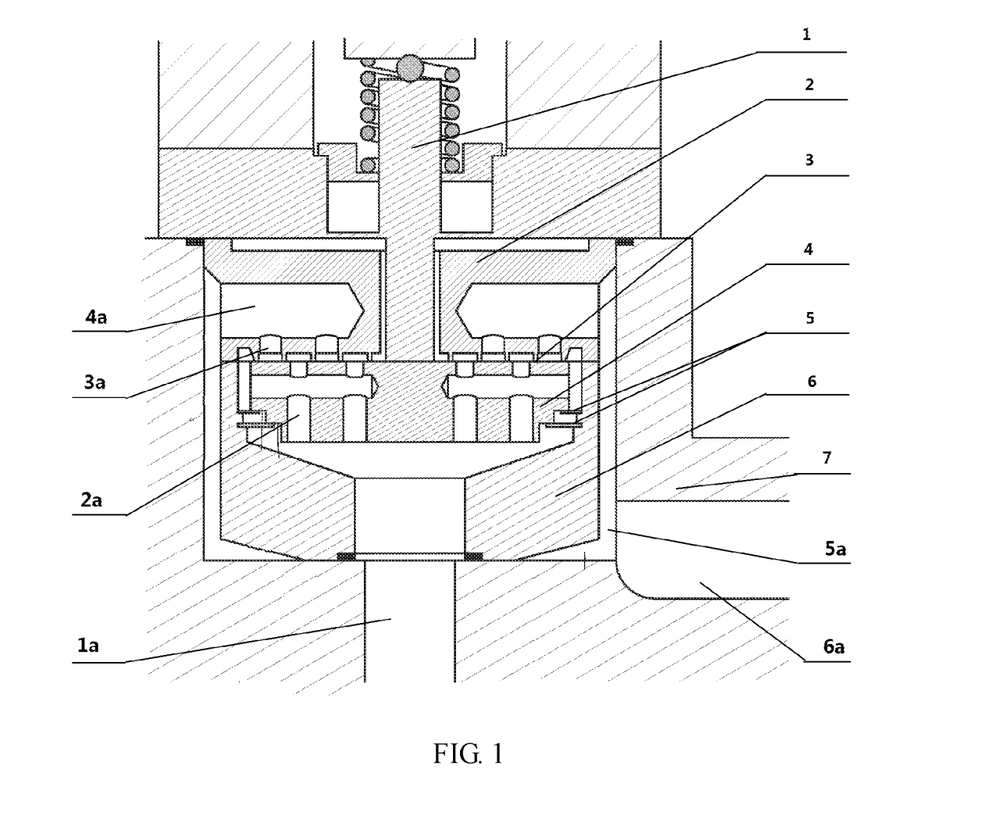
FIG. 1 is a partial cross-sectional view of an existing flow regulating device.

FIG. 1 is a partial cross-sectional view of an existing flow regulating device. Referring to FIG. 1, the flow regulating device includes a push rod 1, a valve port component 2, a valve core component 4, a spring piece 5, a valve sleeve 6, and a channel component 7. The valve core component 4 is elastically connected to the valve sleeve 6 through the spring piece 5; the valve port component 2 is disposed above the valve core component 4; and the push rod 1 penetrates through the valve port component 2 and is in contact with the valve core component 4. In a case where a driving device (not shown) is not powered on, the valve core component 4 and the valve port component 2 are in sealing contact under the action of the elastic force of the spring piece 5, and at the moment, a gap 3 between sealing surfaces of the valve core component 4 and the valve port component 2 is 0, so that the gas channel is closed. When the driving device drives the push rod 1 to descend, the push rod 1 pushes the valve core component 4 to move downwards for a certain distance, the valve core component 4 is separated from the valve port component 2, the gap 3 between the sealing surfaces of the valve core component 4 and the valve port component 2 is of a certain size, and at this time, the gas flows sequentially along channels 1a->2a->3a->4a->5a->6a.

In the above-described flow regulating device, the push rod 1, the valve port component 2, the valve core component 4, the spring piece 5, the valve sleeve 6 and the channel component 7 are used to close or open the gas channel and adjust the flow, and the flow regulating device has a complex structure, high manufacturing and processing difficulty and high rejection rate. Moreover, the valve port component 2, the valve core component 4 and the valve sleeve 6 all come into contact with the gas, and the sealing surfaces have a relatively large area, so that the requirements on the parallelism, the flatness and the surface roughness of the sealing surfaces are relatively high, which results in high processing difficulty and high manufacturing cost of the components. In addition, the existing flow regulating device realizes contact seal or separation of the valve core component 4 and the valve port component 2 by means of the elastic action of the two spring pieces 5, but the spring pieces 5 are frequently compressed, returned and deformed when opening and closing the valve and regulating the flow, so that the spring pieces are likely to become fatigue and fail, resulting in that the failure rate of the valve components is high and the normal use of the device is influenced.

To solve the above problem, referring to FIGS. 2 to 6, an embodiment of the present disclosure provides a flow regulating device, which includes a push rod component 8, a valve port component 9, and a driving assembly. A first inlet channel 91 is provided in the valve port component 9 and configured to deliver a gas into a gap E between the push rod component 8 and the valve port component 9. Specifically, the first inlet channel 91 is a through hole penetrating through the valve port component 9 in a vertical direction. In practical applications, the diameter of the through hole may be designed according to the actual flow requirement.

Figure 2:
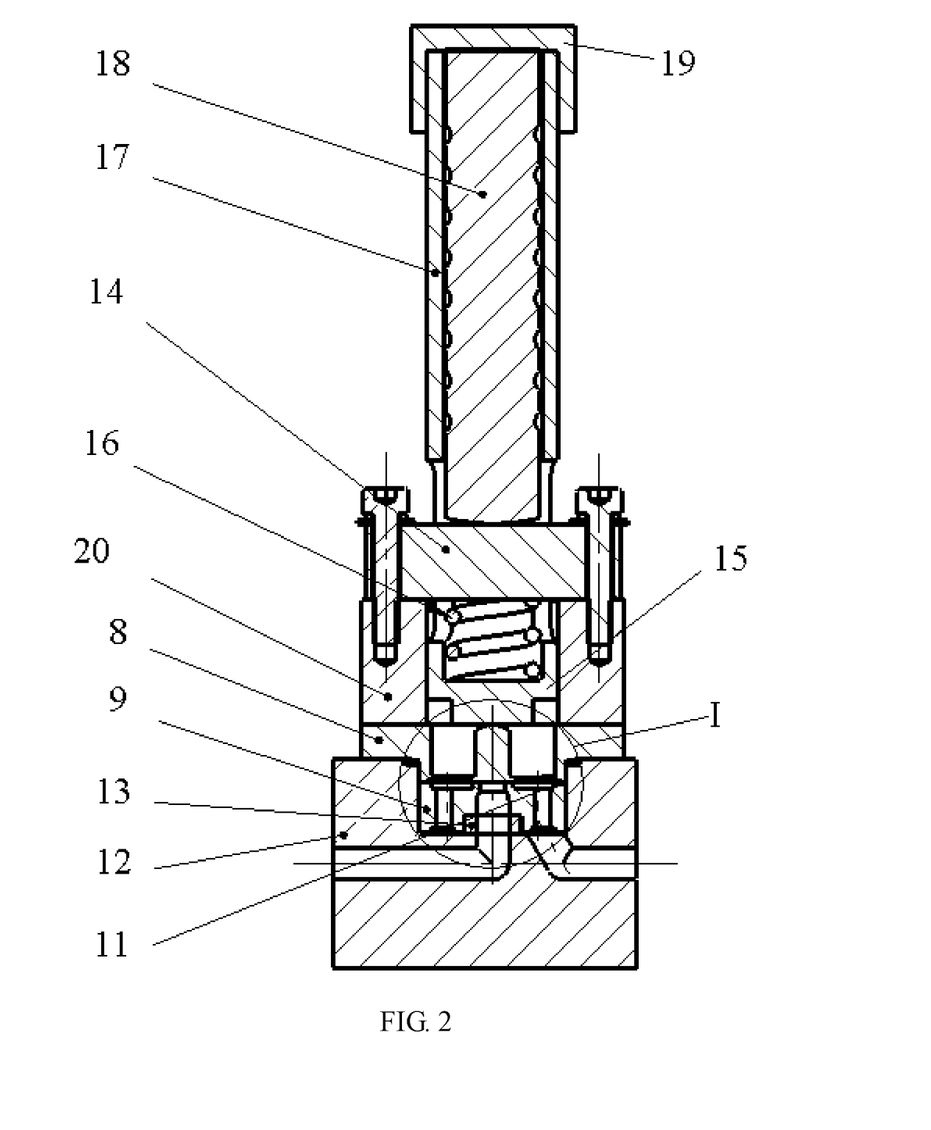
FIG. 2 is a cross-sectional view of a flow regulating device according to an embodiment of the present disclosure.
Figure 5:
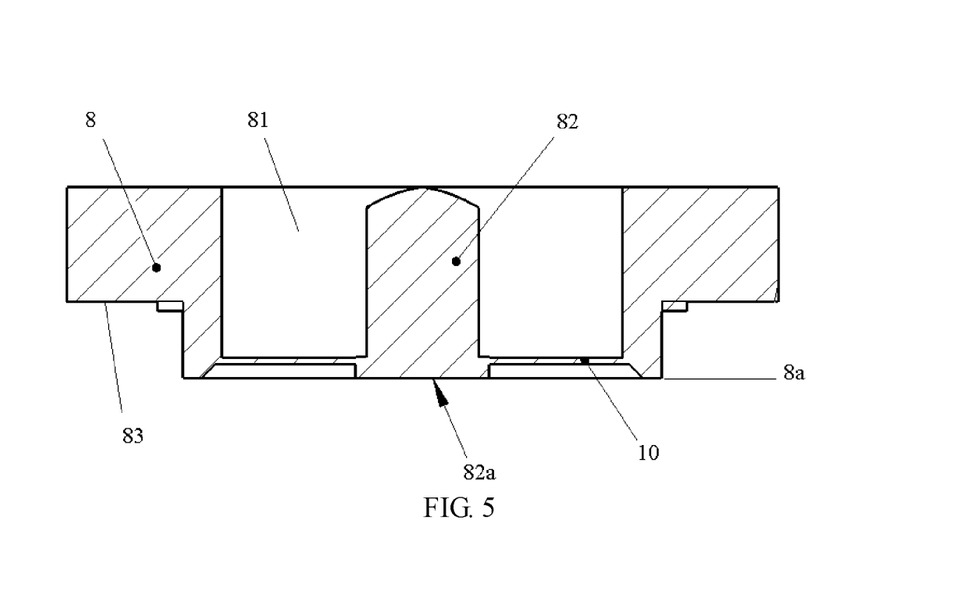
FIG. 5 is a cross-sectional view of a push rod component used in an embodiment of the present disclosure.

A first through hole 81 is provided in the push rod component 8 and penetrates through the push rod component 8 in the vertical direction, a push rod 82 is provided in the first through hole 81, and a first end surface 82a of the push rod 82 faces a gas outlet end (upper end) of the first inlet channel 91. The push rod 82 is elastically connected to the push rod component 8 through an elastic diaphragm 10. The elastic diaphragm 10 can be elastically deformed when the push rod 82 moves downwards, so as to reset the push rod 82. Furthermore, the elastic diaphragm 10 can prevent the gas in the gap E between the push rod component 8 and the valve port component 9 from entering the space of the first through hole 81 above the elastic diaphragm 10, thereby ensuring the gas tightness. Specifically, the elastic diaphragm 10 is annular, an inner edge of the annular elastic diaphragm 10 is connected to an outer peripheral wall of the push rod 82, and an outer edge of the annular elastic diaphragm 10 is connected to a wall of the first through hole 81.

The driving assembly is used to drive the push rod 82 to move in a direction of approaching or leaving the first inlet channel 91, so that the first end surface 82a of the push rod 82 is brought into contact with and seals the gas outlet end of the first inlet channel 91 or separates from the gas outlet end of the first inlet channel 91, thereby closing or opening the gas channel. Moreover, by adjusting a moving distance of the push rod 82, the size of the gap E between the push rod component 8 and the valve port component 9 can be adjusted, and thus the adjustment of the gas flow can be realized.

The push rod component 8 can function as both a valve core and a push rod by means of the push rod 82 and the elastic diaphragm 10, and thus the structure can be simplified. Meanwhile, only the push rod component 8, the valve core component 9 and the elastic diaphragm 10 come into contact with the gas, so that the number of parts that come into contact with the gas can be reduced, which in turn can reduce the processing and product costs. Meanwhile, compared with the existing art, by using the elastic diaphragm 10 to replace the spring piece, the fault caused by the failure of the spring piece can be avoided, and the reliability of the device can be improved.

Figure 3:
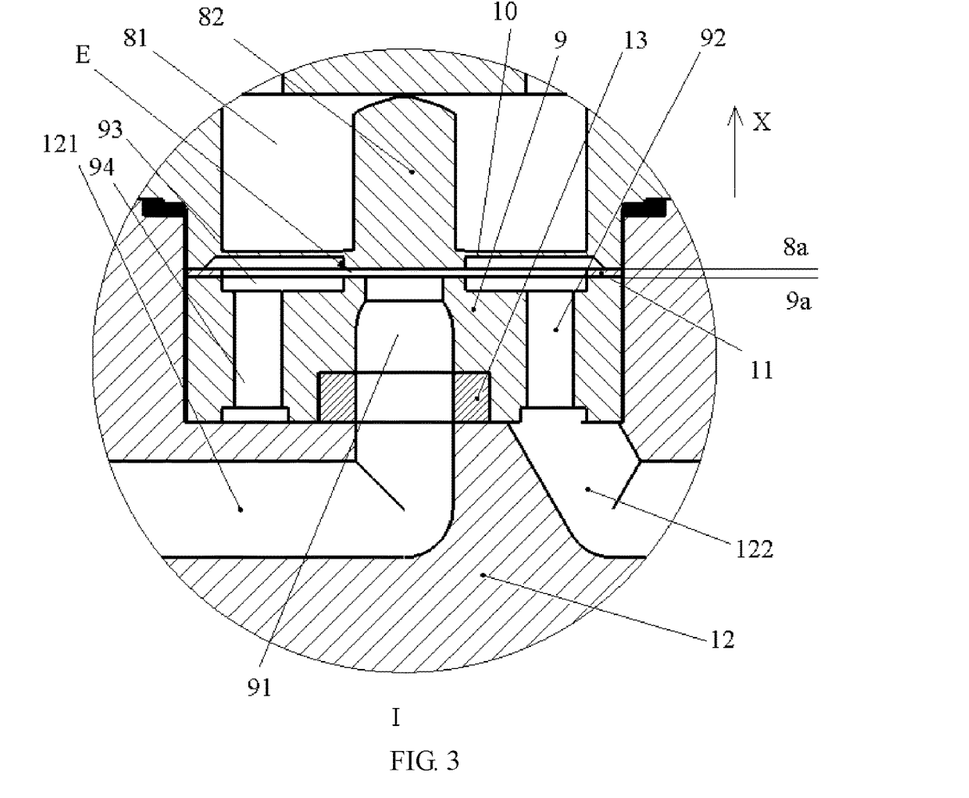
FIG. 3 is an enlarged view of region I of FIG. 2.

In the embodiment, the driving assembly adopts a piezoelectric ceramic driving structure, and has the advantages of large output driving force (typically, several hundreds or even thousands of Newtons), high control accuracy, compact structure, short response time, small electromagnetic pollution, low power consumption, and the like. As shown in FIG. 2, the driving assembly includes a fixing member 14, a compression spring 16 and a connection cavity. The fixing member 14 is disposed on a side (an upper side of the push rod component 8) of the push rod component 8 distal to the first end surface 82a of the push rod 82 and is fixed onto a fixing base 20. The compression spring 16 is disposed between the fixing member 14 and the push rod 82. A connection sleeve 17 and a cover plate 19 disposed at the upper end of the connection sleeve 17 form the connection cavity, the connection sleeve 17 is disposed on a side of the fixing member 14 distal to the compression spring 16, and the lower end of the connection sleeve 17 penetrates through the fixing member 14 and is connected to an end of the compression spring 16 (the lower end of the compression spring 16) proximal to the push rod 82. The connection sleeve 17, the cover plate 19 and the fixing member 14 form an enclosed space, in which a piezoelectric material 18 such as a piezoelectric ceramic is provided, and the piezoelectric material 18 is capable of converting electric energy into mechanical energy. Specifically, the elongation of the piezoelectric material 18 can be adjusted by adjusting a voltage applied to the piezoelectric material 18. In a case where the piezoelectric material 18 elongates by an amount of ΔX in the X direction, the connection sleeve 17 is driven by the piezoelectric material 18 to overcome the elastic force of the compression spring 16 and move a distance of ΔX in a direction away from the push rod 82, in the meanwhile, the push rod 82 moves upward a distance of ΔX under the return action of the elastic diaphragm 10, and at this point, the first end surface 82a of the push rod 82 is separated from the gas outlet end of the first inlet channel 91, as shown in FIG. 3, so that the gas channel is opened. Furthermore, the size of the gap E between the push rod component 8 and the valve port component 9 may be adjusted by adjusting the voltage applied to the piezoelectric material 18, so that the adjustment of the gas flow can be realized.

Optionally, the compression spring 16 is always in a compressed state, so that when the piezoelectric material 18 is not powered on, the first end surface 82a of the push rod 82 may be in contact with and seal the gas outlet end of the first inlet channel 91 under the elastic force of the compression spring 16, thereby realizing a normally closed function.

Figure 4:
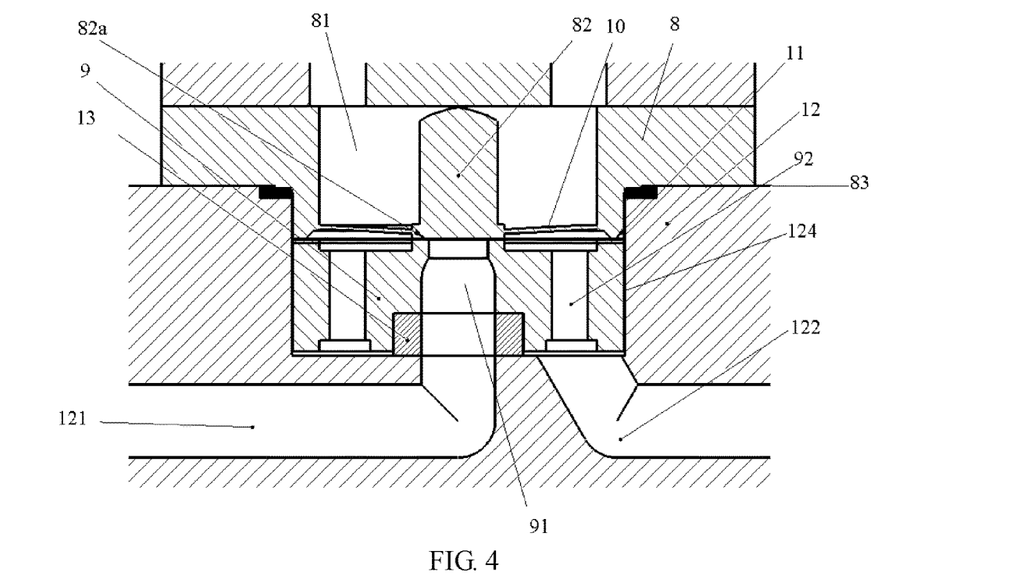
FIG. 4 is a cross-sectional view illustrating that a valve port component and a push rod component are in contact seal in an embodiment of the present disclosure.

Optionally, an annular opening adjusting pad 11 is provided between the valve port component 9 and the push rod component 8 and is configured to adjust the amount of deformation of the elastic diaphragm 10 when the first end surface 82a of the push rod 82 is in contact with and seals the gas outlet end of the first inlet channel 91. As shown in FIG. 3, the valve port component 9 and the push rod component 8 have two opposing surfaces (9a, 8a) facing each other, respectively, and the opening adjusting pad 11 is disposed between the two opposing surfaces (9a, 8a). As shown in FIG. 4, the thicker the opening adjusting pad 11 is, the larger the amount of deformation of the elastic diaphragm 10 is when the first end surface 82a of the push rod 82 is in contact with and seals the gas outlet end of the first inlet channel 91.

In the embodiment, a first outlet channel 92 is further provided in the valve port component 9, and a gas inlet end of the first outlet channel 92 connects with an gas outlet end of the first inlet channel 91 when the first end surface 82a of the push rod 82 is separated from the gas outlet end of the first inlet channel 91. Specifically, as shown in FIG. 3, when the first end surface 82a of the push rod 82 is separated from the gas outlet end of the first inlet channel 91, the gas enters the gap E between the push rod component 8 and the valve port component 9 via the first inlet channel 91, and then flows out through the first outlet channel 92.

In the embodiment, the gas flow regulating device further includes a channel component 12 disposed on a side of the valve port component 9 (a lower side of the valve port component 9) distal to the push rod component 8, and the channel component 12 overlaps with the valve port component 9. A second inlet channel 121 and a second outlet channel 122 are provided in the channel component 12, a gas outlet end of the second inlet channel 121 is connected to the gas inlet end (the lower end) of the first inlet channel 91; and a gas inlet end of the second outlet channel 122 is connected to the gas outlet end (the lower end) of the first outlet channel 92.

When the first end surface 82a of the push rod 82 is separated from the gas outlet end of the first inlet channel 91, the gas enters the gap E between the push rod component 8 and the valve port component 9 sequentially through the second inlet channel 121 and the first inlet channel 91, and then flows out sequentially through the first outlet channel 92 and the second outlet channel 122.

In the embodiment, as shown in FIG. 4, the surface of the channel component 12 facing the valve port component 9 serves as a channel sealing surface, on which a groove 124 is provided, and the valve port component 9 is provided in the groove 124. The push rod component 8 includes a body in which the first through hole 81 is provided, and the body and the valve port component 9 overlap with each other. A boss is circularly provided on an outer peripheral wall of the body, a lower surface 83, serving as a sealing surface, of the boss is stacked on the channel sealing surface of the channel component 12, and a first seal member, such as a sealing gasket, is provided between the boss and the channel sealing surface. In this way, the sealing surfaces of the push rod component 8 and the valve port component 9 can be reduced, the processing difficulty is reduced, and thus the processing cost can be reduced.

Figure 6:
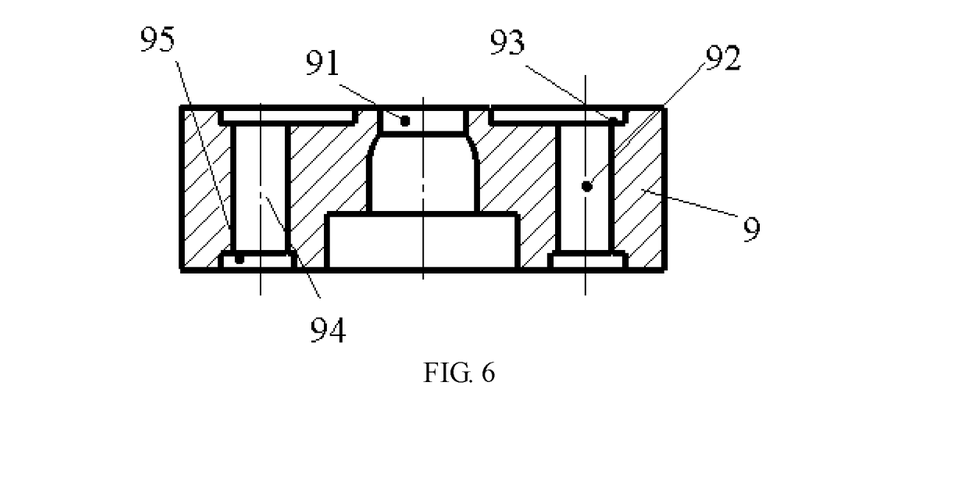
FIG. 6 is a cross-sectional view of a valve port component used in an embodiment of the present disclosure.

In the embodiment, as shown in FIG. 6, a first annular groove 93 is provided on a surface (an upper surface of the valve port component 9) of the valve port component 9 facing the push rod component 8. A plurality of spaced second through holes 94 are provided on the bottom surface of the first annular groove 93 along the circumferential direction of the first annular groove 93, and one of the second through holes serves as the first outlet channel 92 and connects with the second outlet channel 122. All of the second through holes 94 are connected with one another by the first annular groove 93.

With the first annular groove 93 and the second through holes 94, the gap E between the push rod component 8 and the valve port component 9 can be designed to be sufficiently small, so that the response speed can be increased and the response time can be shortened. The sizes of the first annular groove 93 and the second through holes 94 (e.g., depth of the first annular groove 93 and diameters of the second through holes 94) may be set according to the actual flow.

Optionally, a second annular groove 95 is further provided on the surface of the valve port component 9 facing the channel component 12, and the second annular groove 95 connects with each of the second through holes 94. The second annular groove 95 achieves the same function as the first annular groove 93 as described above.

In the embodiment, a second seal member 13 is provided between the valve port component 9 and the channel component 12 and around the first inlet channel 91 to seal a gap between the valve port component 9 and the channel component 12, so as to prevent the gas in the first inlet channel 91 from leaking out of the gap.

It should be noted that, in the embodiment, the driving assembly adopts a piezoelectric ceramic driving structure to drive the push rod 82 to move in a direction of approaching or leaving the first inlet channel 91, but the present disclosure is not limited thereto, and in practical applications, a linear drive source may be adopted to drive the push rod 82 to move in the direction of approaching or leaving the first inlet channel 91. The linear drive source is, for example, a linear motor, a voice coil motor, an electric putter, or the like.

As another technical solution, an embodiment of the present disclosure further provides a mass flow controller, which includes the gas flow regulating device provided in the embodiments of the present disclosure.

Figure 7:
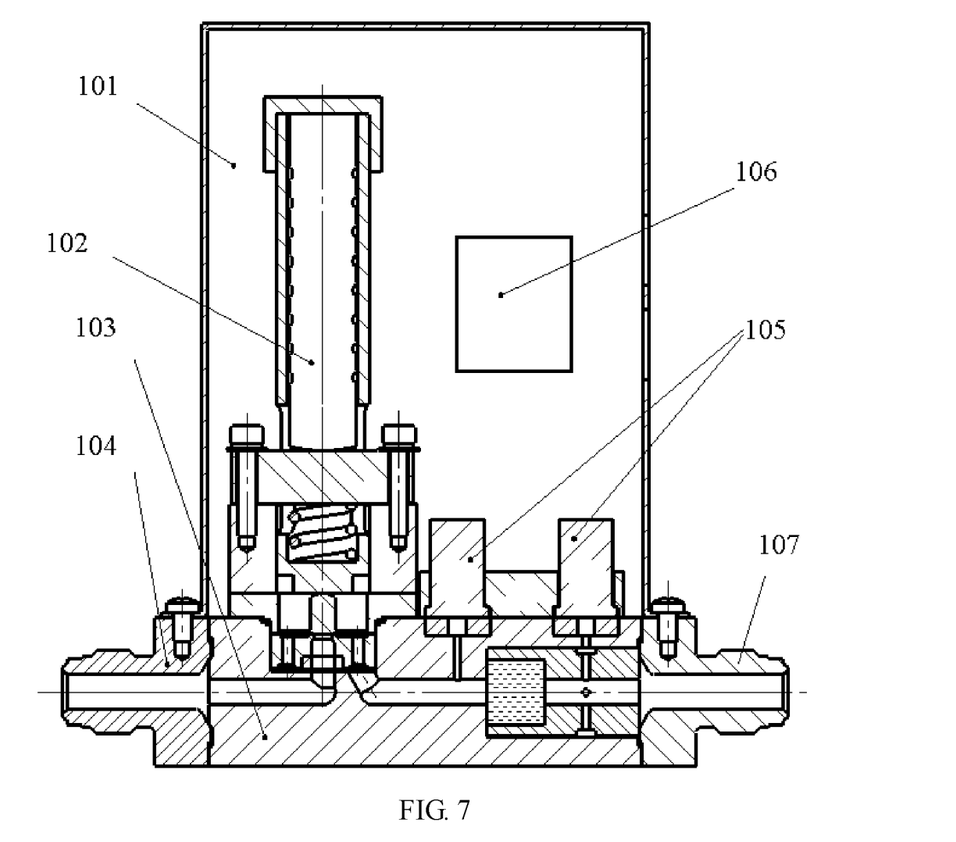
FIG. 7 is a cross-sectional view of a mass flow controller according to an embodiment of the present disclosure.

In the embodiment, as shown in FIG. 7, the mass flow controller further includes a housing 101, a gas flow regulating device 102, a gas channel 103, an inflow port 104, a flow measuring device 105, and an outflow port 107. A gas inlet end of the gas channel 103 is connected to the inflow port 104; the gas flow regulating device 102 is disposed on the gas channel 103 and is used to regulate the gas flow in the gas channel 103; and the outflow port 107 is connected to a gas outlet end of the gas channel 103.

In the embodiment, the mass flow controller further includes a control circuit board 106 configured to receive a flow detection signal sent from the flow measuring device 105, perform difference calculation on the flow detection signal and a set flow value, and control the gas flow regulating device 102 to regulate the gas flow passing through the gas channel 103 according to the calculation result until the gas flow is equal to the set flow value. In this way, the gas mass flow can always be the set flow value. Optionally, the control circuit board 106 may be further provided with a digital communication function, and can perform data interaction with a computer, so as to implement remote control of the computer.

In the mass flow controller provided by the embodiments of the present disclosure, by adopting the gas flow regulating device provided by the embodiments of the present disclosure, the structure can be simplified, and the number of parts in contact with the gas can be reduced, so as to reduce the processing and product costs; in addition, the fault caused by the failure of the spring piece can be avoided, thereby improving the reliability of the device.

It should be understood that the above implementations are merely exemplary implementations employed for illustrating the principles of the present disclosure, but the present disclosure is not limited thereto. Various modifications and improvements can be made by those skilled in the art without departing from the spirit and essence of the present disclosure, and these modifications and improvements should also be considered to fall within the protection scope of the present disclosure.

What is claimed is:

1. A gas flow regulating device, comprising:
    a valve port component, wherein a first inlet channel is provided in the valve port component;
    a push rod component, wherein a first through hole is provided in the push rod component, a push rod is provided in the first through hole, a first end surface of the push rod faces a gas outlet end of the first inlet channel, and the push rod is elastically connected with the push rod component through an elastic diaphragm; and
    a driving assembly configured to drive the push rod to move along a direction of approaching or leaving the first inlet channel to cause the first end surface of the push rod to be in contact with and seal the gas outlet end of the first inlet channel or to be separated from the gas outlet end of the first inlet channel; and
    the driving assembly comprises:
    a fixing piece disposed on a side of the push rod component distal to the first end surface of the push rod;

a compression spring set between the fixing piece and the push rod; and a connection cavity disposed on a side of the fixing piece distal to the compression spring, wherein an end of the connection cavity penetrates through the fixing piece and is connected with an end of the compression spring proximal to the push rod; the connection cavity and the fixing piece form a closed space, and a piezoelectric material is provided in the closed space; and elongation of the piezoelectric material is adjustable by adjusting a voltage applied to the piezoelectric material, so as to adjust a displacement amount of the connection cavity along a direction of leaving the push rod along with the elongation of the piezoelectric material.

2. The gas flow regulating device of claim 1, wherein an annular opening adjusting pad is provided between the valve port component and the push rod component, and is configured to adjust deformation of the elastic diaphragm when the first end surface of the push rod is brought into contact with and seals the gas outlet end of the first inlet channel.

3. The gas flow regulating device of claim 1, wherein the compression spring is in a compressed state such that the first end surface of the push rod is brought into contact with and seals the gas outlet end of the first inlet channel under elastic action of the compression spring when the piezoelectric material is not powered on.

4. The gas flow regulating device of claim 1, wherein a first outlet channel is further provided in the valve port component, and a gas inlet end of the first gas outlet channel connects with the gas outlet end of the first inlet channel when the first end surface of the push rod is separated from the gas outlet end of the first inlet channel; and the gas flow regulating device further comprises a channel component disposed on a side of the valve port component distal to the push rod component, and the channel component overlaps with the valve port component, and a second inlet channel and a second outlet channel are provided in the channel component, wherein a gas outlet end of the second inlet channel is connected to the gas inlet end of the first inlet channel; and a gas inlet end of the second outlet channel is connected to the gas outlet end of the first outlet channel.

5. The gas flow regulating device of claim 4, wherein a surface of the channel component facing the valve port component serves as a channel sealing surface, and a groove is provided on the channel sealing surface, and the valve port component is disposed in the groove; and the push rod component comprises a body, the first through hole is provided in the body, and the body and the valve port component overlap with each other; a boss is circularly provided on a peripheral wall of the body, the boss is stacked on the channel sealing surface, and a first seal member is provided between the boss and the channel sealing surface.

6. The gas flow regulating device of claim 4, wherein a first annular groove is provided on a surface of the valve port component facing the push rod component; a plurality of spaced second through holes are provided along a circumferential direction of the first annular groove on a bottom surface of the first annular groove, and one of the plurality of second through holes serves as the first outlet channel.

7. The gas flow regulating device of claim 6, wherein a second annular groove is further provided on a surface of the valve port component facing the channel component, and the second annular groove connects with each of the plurality of second through holes.

8. The gas flow regulating device of claim 4, wherein a second seal member is provided between the valve port component and the channel component and around an inner circumferential wall of the first inlet channel.

9. The gas flow regulating device of claim 1, wherein the driving assembly comprises a linear drive source.

10. A mass flow controller, comprising the gas flow regulating device of claim 1.

11. The mass flow controller of claim 10, further comprising:

an inflow port;

a gas channel, wherein a gas inlet end of the gas channel is connected with the inflow port; the gas flow regulating device is disposed on the gas channel and configured to regulate gas flow in the gas channel; and an outflow port connected with a gas outlet end of the gas channel.

12. The mass flow controller of claim 10, further comprising:

a control circuit board configured to receive a flow detection signal sent from a flow measuring device, perform difference calculation on the flow detection signal and a set flow value, and control the gas flow regulating device to regulate the gas flow passing through the gas channel according to a calculation result until the gas flow is equal to the set flow value.

* * * * *